(No Model.)
P. W. GATES.
STONE BREAKING AND CRUSHING MACHINE.
No. 279,146. Patented June 12, 1883.
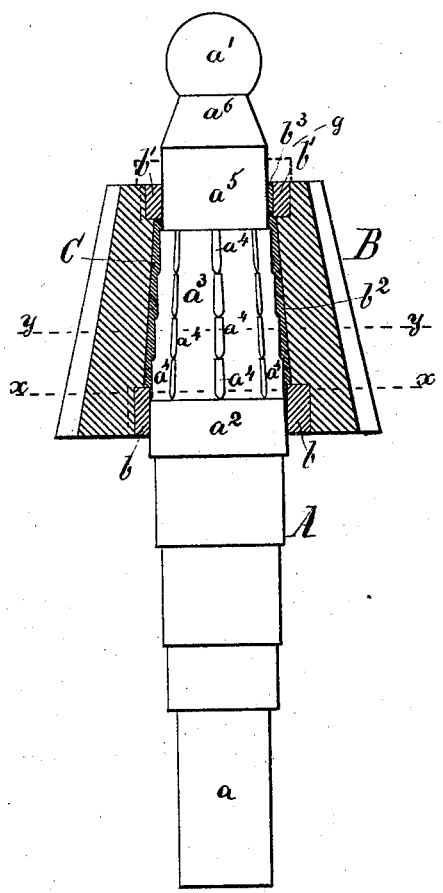
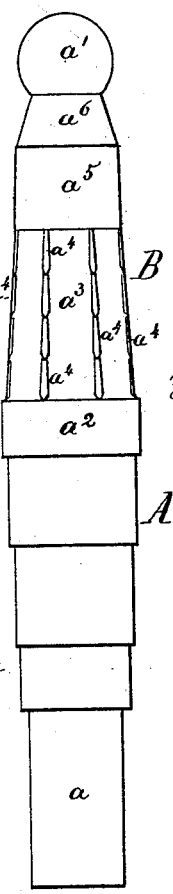
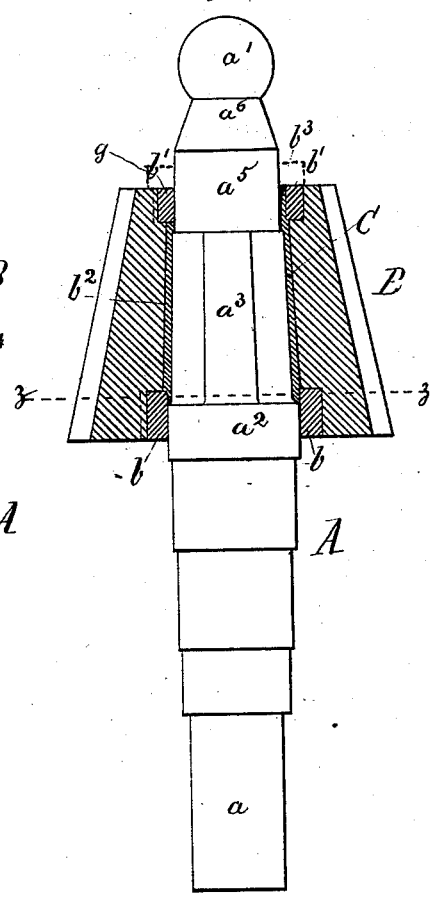
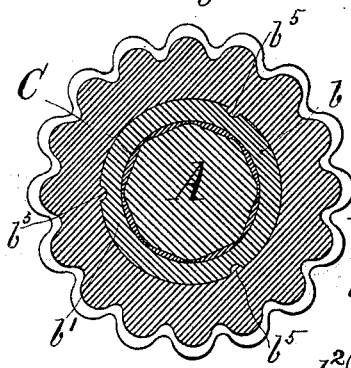
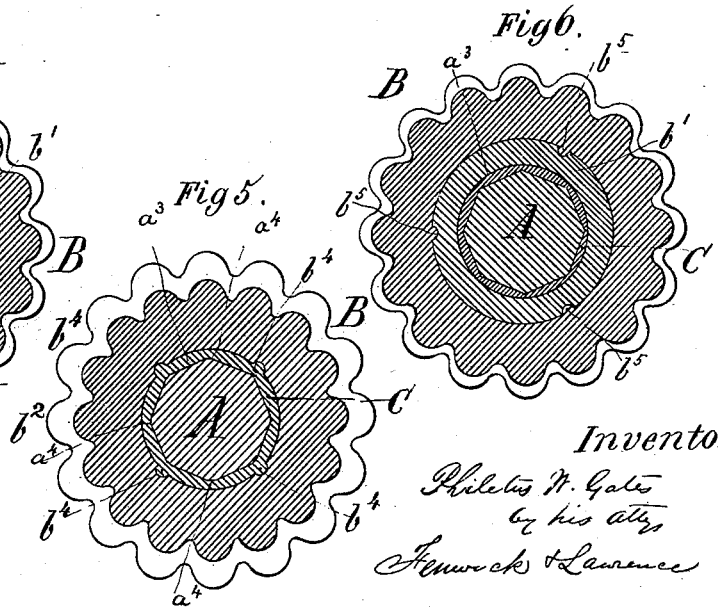

UNITED STATES PATENT OFFICE.

PHILETUS W. GATES, OF CHICAGO, ILLINOIS.

STONE BREAKING AND CRUSHING MACHINE.

SPECIFICATION forming part of Letters Patent No. 279,146, dated June 12, 1883.

Application filed March 30, 1883. (No model.)

*To all whom it may concern:*

Be it known that I, PHILETUS W. GATES, a citizen of the United States, residing at Chicago, in the county of Cook and State of Illinois, have invented a new and useful Improvement in Stone Breaking and Crushing Machines, of which the following is a specification.

My invention relates to improvements in means for effecting a secure attachment to its shaft of the conical head of a stone breaking or crushing machine; also for effecting a central adjustment of the head upon its shaft, whereby the crusher-head is prevented from working loose upon the shaft the difficulties of turning out mechanically, the inner bearings of the crusher-head overcome, and the removal of the head from its shaft effected without taking out the shaft.

In the accompanying drawings, Figure 1 is an elevation of a gyrating shaft and a section of its crusher-head constructed and united in accordance with my invention. Fig. 2 is an elevation of the gyrating shaft, showing the taper profile of its polygonal bearing portion. Fig. 3 is a modified construction of the parts shown in Figs. 1 and 2. Fig. 4 is a horizontal section in the line $x$ $x$ of Fig. 1. Fig. 5 is a horizontal section in the line $y$ $y$ of Fig. 1, and Fig. 6 is a horizontal section in the line $z$ $z$ of Fig. 3.

In the practical use of the means, as shown in my Letters Patent No. 243,545, dated June 28, 1881, for connecting the crusher-head to its gyrating shaft, hereinafter referred to, inconveniences and difficulties were experienced when renewal of the head or repair of the parts became necessary. The crusher-head and shaft had to be lifted out of the machine together, and as these parts are of very great weight and size, and are operated at a considerable elevation from the ground, the withdrawal of the crusher-head and shaft together from the machine involved considerable loss of time and labor. After the crusher-head and shaft had been removed from the machine and placed upon the ground a fire had to be built around them and kept up until they were sufficiently heated to melt the zinc fastening within the head and to run out all the zinc, which caused expenditure for fuel as well as loss of time. If the fitting-surfaces of the crusher-head and shaft were made parallel—i. e., cylindrical, prismatical, or otherwise analogous—the shaft and crusher-head would not easily become loose in their operation; but in this case the upper portion of the shaft would be so thick as to necessitate the making of the upper portion of the crusher-head too thin for practical use or to withstand the strains brought to bear upon it. I have by my present invention provided means for separating the crusher-head from the shaft while in the machine, and have also improved the means for fitting and firmly uniting the crusher-head and shaft, so as to avoid upward movement of the crusher-head and undue wear of the fittings.

In the drawings, A represents a gyrating shaft having a lower bearing, $a$, and a spherical bearing, $a'$. This shaft is applied in a stone breaker and crusher in any of the ways shown in Letters Patent heretofore granted to me and others—as, for instance, June 28, 1881, No. 243,545. The middle portion, $a^2$, of this shaft, when constructed as in Figs. 1, 2, 4, and 5, is made with a much greater diameter than the end portions, in order to strengthen the shaft and prevent it from springing or bending. The portion $a^2$ is almost cylindrical, having but a slight taper. Above it the shaft is of pyramidal form, as shown at $a^3$, with the corners broken at intervals to form steps $a^4$, and above this pyramidal portion another almost cylindrical bearing, $a^5$, smaller in diameter than $a^2$, is formed just below the neck $a^6$ of the spherical bearing $a'$, a very slight taper being given to this bearing $a^5$.

The crusher-head B being made usually of the hardest metal known, either chilled or white metal, it is impossible to properly turn out and fit it to the shaft A, and therefore I provide a ring or bushing, $b$, at the lower portion of the head, and another, $b'$, at the upper portion thereof. These bushings $b$ $b'$ are made of ordinary cast-iron, in order that they may be bored and truly finished in a lathe, so as to very accurately fit the bearings $a^2$ $a^5$ of the shaft. These bushings are inserted in the mold of the crusher-head, and when the pattern of the crusher-head is removed from the sand these bushings remain, occupying a true central position within the mold, and when finally the melted iron for forming the head is flowed into the mold it surrounds these bushings, and in cooling off contracts and holds them with a very firm grip. The crusher-head can now be placed in a lathe and the bushings bored with a slight taper, corresponding to the taper of the bearings $a^2$ $a^5$ of the shaft. The inner portion, $b^2$, of the crusher-head, between the bushings $b$ $b'$, is made of larger diameter than the pyramidal part $a^3$ of the shaft A, and thus when the head is placed upon the shaft a continuous space, $b^2$, is formed around the same, and this space is filled with melted zinc C, a small aperture, $b^3$, being left in the upper bushing, through which the melted zinc is poured in. When the inner surface of the crusher-head is round, as shown, it is provided with longitudinal grooves $b^4$, which serve as keys to the zinc lining C and prevent the crusher-head from turning upon it. A polygonal or other irregular shape of the surface of the space $b^2$ would have the same effect of securing the lining to the crusher-head. Grooves $b^5$, similar to those $b^4$, may be provided in the periphery of the bushing-rings $b$, as shown, for a like purpose. This mode of construction enables me to manufacture my crusher-heads and shafts much quicker and with less labor and expense than by the old mode. The bushings $b$ $b'$ prevent any yielding of the zinc lining of the crusher-head, and thus prevent its rising upon its shaft and causing the zinc to be unduly worn.

When repairs become necessary the head B is lifted from the shaft A, which latter remains in the machine, the portions of zinc lining remaining in the space within the head are removed, and the crusher-head B is again slid upon the shaft A, and a new supply of melted zinc is flowed into the aperture $b^3$. When the zinc is sufficiently cooled and hardened, the shaft is again secured in its upper bearing and the machine ready for operation.

I have found that in smaller machines, and for the performance of ordinary work, a simple pyramidal formation, $a^3$, without the chamfered corners or flat steps $a^4$, will suffice to make the connection between the head and its shaft effective and durable. Such construction without the steps is shown in Figs. 3 and and 6, and it is, with the exception of not having the steps, the same in all other respects as the construction shown in Figs. 1, 2, 4, and 5, and therefore I intend to embrace both forms of construction under my patent.

I would state that I intend to provide, should it be found necessary to hold the crusher-head B down positively upon the pyramidal bearing of the shaft, a nut or clasping-collar upon the shaft A for the purpose of preventing an upward movement of the head, as illustrated by dotted lines at $g$; but my present experience is that the conical crusher-head, on account of its weight and other causes, will always find a firm seat upon said pyramidal bearing portion of the shaft while crushing stone in the ordinary flaring concave.

I would state, further, that a very good result could be secured by making the crusher-head with but one slightly-tapered bored bushing, as $b$ or $b'$, located at either the top or bottom of the head, and with but one slightly-tapered turned portion, as $a^2$ or $a^5$, located at either the top or bottom of the head, and that while I prefer the constructions shown I intend to embrace one or more slightly-tapered bored bushings of soft metal and one or more slightly-tapered turned portions on the shaft under my patent.

What I claim as my invention, and desire to secure by Letters Patent, is—

1. The combination, with the crusher-shaft having its periphery provided with one or more tapered circular bearing-surfaces for limiting downward movement, and a pyramidal packing-metal bearing-surface, $a^3$, for preventing horizontal movement, of a crusher-head having one or more soft-metal bushings bored with a taper corresponding with the tapered turned circular bearing surface or surfaces of the shaft, and the packing metal C, corresponding on its bearing-surface with the bearing $a^3$ of the shaft, substantially as and for the purpose described.

2. The combination, with the shaft A, having the turned tapered circular bearing-surfaces for limiting downward movement, and a pyramidal packing-metal bearing-surface, $a^3$, having steps $a^4$ for limiting horizontal movement, of a crusher-head having bushings $b$ $b'$, which are bored with a taper corresponding to the turned tapered circular bearing-surfaces of the shaft, and the packing metal C, substantially as and for the purpose described.

3. The crusher-head B for the shaft of a stone breaker or crusher, formed of hard metal, packing metal C, and soft-metal bushings $b$ $b'$, the latter capable of being bored to fit the shaft upon which the head is to be applied, substantially as and for the purpose described.

4. A shaft for the crusher-head of a stone breaker or crusher, provided with the tapered bearing-surfaces which limit downward movement of the crusher-head, and a pyramidal surface, $a^3$, which prevents horizontal movement of the said head, substantially as and for the purpose described.

PHILETUS W. GATES.

Witnesses:
P. W. GATES, Jr.,
ELIAS JEWELL.